US010646833B2

(12) United States Patent
Boissy (10) Patent No.: US 10,646,833 B2
(45) Date of Patent: May 12, 2020

(54) CONTAINER AND FITMENT FOR USE IN HIGH PRESSURE PROCESSING

(71) Applicant: Freshbev, LLC, New Haven, CT (US)

(72) Inventor: Michel Boissy, New Haven, CT (US)

(73) Assignee: Freshbev, LLC, New Haven, CT (US)

(*) Notice: Subject to any disclaimer, the term of this patent is extended or adjusted under 35 U.S.C. 154(b) by 590 days.

(21) Appl. No.: 15/254,153

(22) Filed: Sep. 1, 2016

(65) Prior Publication Data

US 2017/0006900 A1    Jan. 12, 2017

Related U.S. Application Data

(62) Division of application No. 15/081,188, filed on Mar. 25, 2016, now Pat. No. 9,849,429.

(60) Provisional application No. 62/189,470, filed on Jul. 7, 2015.

(51) Int. Cl.
| | |
|---|---|
| *B01F 3/08* | (2006.01) |
| *B65B 7/02* | (2006.01) |
| *B65D 85/72* | (2006.01) |
| *A23L 3/015* | (2006.01) |
| *B01F 13/10* | (2006.01) |
| *B01F 15/02* | (2006.01) |
| *B65D 75/58* | (2006.01) |
| *B65D 47/12* | (2006.01) |

(Continued)

(52) U.S. Cl.
CPC .......... *B01F 3/0861* (2013.01); *A23L 3/0155* (2013.01); *B01F 13/1055* (2013.01); *B01F 15/0243* (2013.01); *B65B 7/02* (2013.01); *B65D 47/12* (2013.01); *B65D 47/121* (2013.01); *B65D 47/283* (2013.01); *B65D 51/1611* (2013.01); *B65D 75/5877* (2013.01); *B65D 85/72* (2013.01); *A23V 2002/00* (2013.01)

(58) Field of Classification Search
CPC ................ B01F 3/0861; B01F 13/1055; B01F 15/0243; A23L 3/0155; B65B 7/02; B65D 47/12; B65D 47/121; B65D 47/283; B65D 51/1611; B65D 75/5877; B65D 85/72
USPC ......................................................... 99/295
See application file for complete search history.

(56) References Cited

U.S. PATENT DOCUMENTS

| | | |
|---|---|---|
| 1,944,811 A | 1/1934 | Rogers, Jr. |
| 3,830,405 A | 8/1974 | Jaeger |
| 4,057,223 A | 11/1977 | Rosenberger |

(Continued)

FOREIGN PATENT DOCUMENTS

WO    WO 2017/007896 A1    1/2017

OTHER PUBLICATIONS

International Search Report for International Appln. No. PCT/US2015/041276; International Filing Date: Jul. 7, 2016; dated Dec. 2, 2016; 10 pages.

(Continued)

*Primary Examiner* — Brian W Jennison
(74) *Attorney, Agent, or Firm* — Mark Nowotarski (57) ABSTRACT

A container assembly configured for use in a high pressure process (HPP) includes a container defining a container cavity and a fitment assembly coupled to the container. The fitment assembly defines a passageway arranged in fluid communication with the container cavity. The fitment assembly further defines a chamber within the passageway isolated from the container cavity. A pressure relief mechanism is operably coupled to the fitment assembly to relieve pressure within the chamber.

6 Claims, 9 Drawing Sheets

(51) Int. Cl.
B65D 47/28 (2006.01)
B65D 51/16 (2006.01)

(56) References Cited

U.S. PATENT DOCUMENTS

| | | | |
|---|---|---|---|
| 5,232,726 | A | 8/1993 | Clark et al. |
| 5,664,940 | A | 9/1997 | Du |
| 6,183,800 | B1 | 2/2001 | van Straten et al. |
| D489,603 | S | 5/2004 | Berman |
| 2002/0043071 | A1 | 4/2002 | Frank et al. |
| 2002/0066714 | A1* | 6/2002 | Mainquist .......... B65D 51/1633 215/261 |
| 2006/0054614 | A1 | 3/2006 | Baxter et al. |
| 2009/0095369 | A1 | 4/2009 | Murray |
| 2009/0283553 | A1 | 11/2009 | Hoss et al. |
| 2010/0224649 | A1 | 9/2010 | Hoover |
| 2012/0104024 | A1 | 5/2012 | Anselmino et al. |
| 2012/0199013 | A1 | 8/2012 | Gutierrez |
| 2012/0298693 | A1 | 11/2012 | Jersey et al. |
| 2013/0056493 | A1 | 3/2013 | Newton et al. |
| 2013/0078339 | A1* | 3/2013 | Trahan .................. A23L 3/0155 426/107 |
| 2013/0266699 | A1* | 10/2013 | Middis ............... B65D 81/3461 426/113 |
| 2014/0226922 | A1 | 8/2014 | Bons et al. |
| 2014/0314918 | A1 | 10/2014 | Wettlaufer et al. |
| 2016/0130127 | A1 | 5/2016 | Copenhaver et al. |
| 2017/0006899 | A1 | 1/2017 | Boissy |

OTHER PUBLICATIONS

Restriction Requirement for U.S. Appl. No. 15/081,188; filed Mar. 25, 2016; Notification Date: Jul. 8, 2016; Available in Image File Wrapper; 8 pages.
Scholle Packaging; Scholle Truefill 900 Series; Received: Jun. 16, 2015; US Location: 200 West North Avenue, Northlake, IL 60164; 2 pages.
Scholle Pacaking; The Pioneer of Bag-in-Box Filler; www.scholle. com; Received Jun. 16, 2015; 2 pages.
United States Patent 7 Trademark Office Non Final Office Action for U.S. Appl. No. 15/081,188, filed Mar. 25, 2016; Notification date: Oct. 26, 2016; 7 pgs.
Written Opinion of the International Searching Authority for International Appln. No. PCT/US2015/041276; International Filing Date: Jul. 7, 2016; dated Dec. 2, 2016; 6 pages.
Final Office Action; U.S. Appl. No. 15/081,188, filed Mar. 25, 2016; Container and Fitment for Use in High Pressure Processing; Notification date: Apr. 28, 2017; 10 Pages.
Invitation to Pay Additional Fees; International Application No. PCT/US2016/041276; International Filing Date: Jul. 7, 2016; dated Sep. 20, 2016; 2 Pages.
Written Opinion of the International Search Authority for PCT/US2018/026651 for Freshbev LLC dated Jul. 30, 2018.
International Search Report for PCT/US2018/026651 for Freshbev LLC dated Jul. 30, 2018.
Soda Dispenser Depot, 4 Flojet G55 Series Pumps with BIB Hose and BIB Connects Mounted on Pump Brackets, http://www.sodadispenserdepot.com/pics/flojet11151.html last viewed Aug. 13, 2018.
Specifications for Flojet G55 Series, High Performing G55 Series $CO_2$ Operated Bag-In-Box Pump last viewed Aug. 13, 2018.
Installation, Operation and Maintenance Manual For G70 / G71 Series Air Driven Diaphragm Pumps dated Jun. 2015.
Hamilton Beach Commerical, COT2000 Series PrimePour™ Cocktails on Tap dated Jun. 2015.
Restaurant Services Inc. TenderPOUR®, http://rsidrivesroi.com/portfolio/tenderpour-system/, and https://web.archive.org/web/20160327123022/http://rsidrivesroi.com/portfolio/tenderpour-system/ dated Mar. 27, 2016 and TenderPour™, https://web.archive.org/web/20160129211615/http://rsidrivesroi.com/ dated Jan. 29, 2016.
Restaurant Services Inc. TenderPOUR® Component Pricing Options last viewed Aug. 17, 2018.
USPTO TenderPOUR Trademark Registration last viewed Aug. 17, 2018.
USPTO TenderPOUR Trademark Registration details last viewed Aug. 17, 2018.
Innovative Dispense Solutions, Cocktail on Tap Dispenser Weekly Cleaning Guide—QCD & Bottle Reserves, www.innovativedispensing. com dated Nov. 8, 2012.
Innovative Dispense Solutions, Cocktail on Tap Dispenser Operational/Set Up Guide—QCD & Bottle Reserves, www.innovativedispensing. com dated Nov. 8, 2012.
En.Wikipedia.org, Reservoir, https://en.wikipedia.org/wiki/Reservoir last viewed Sep. 26, 2018.
International Search Report of the International Searching Authority for PCT/US16/41276 dated Dec. 2, 2016.
Written Opinion of the International Searching Authority for PCT/US16/41276 dated Dec. 2, 2016.
California Beverage Technology Cocktail Mixing Station Photograph taken Mar. 4, 2013.
FLOJET, Model N5000 $CO_2$ Operated Bag-in-Box Pump dated 2001.

* cited by examiner

CONTAINER AND FITMENT FOR USE IN HIGH PRESSURE PROCESSING

CROSS REFERENCE TO RELATED APPLICATIONS

This application is a divisional of U.S. application Ser. No. 15/081,188, filed Mar. 25, 2016, which claims the benefit of U.S. Provisional Application No. 62/189,470, filed Jul. 7, 2015, the contents of which are incorporated by reference in their entirety herein.

BACKGROUND

The subject matter disclosed herein generally relates to the preparation of cold-pressed fresh juice and other liquids having an extended shelf-life achieved via high pressure processing, and more particularly, to various types of packaging for use with a high pressure process.

Foods and beverages have traditionally been preserved to prolong their shelf-life through the use of chemical and thermal treatment. Pasteurization via thermal treatments has been recognized as an effective means for inactivating microorganisms such as harmful pathogens that may exist in many unprocessed food and beverage products. If left unchecked, these microorganisms can not only cause premature food and beverage spoilage, but can also result in serious health problems, and sometimes death. Although heating food and beverages effectively reduces levels of microorganisms therein, such processing can alter the fresh and natural taste and flavor of the food and beverages while reducing the natural nutrients therein.

Non-thermal processing of foods, such as through a high pressure process ("HPP"), also referred to as high hydrostatic pressure processing or ultra-high pressure processing, is considered a more natural and equally effective means of processing than conventional thermal processing. HPP is used to pasteurize foods at elevated pressures of approximately 30,000 to 130,000 pounds per square inch ("psi") for a specified temperature and time. The pressure is applied through a pressure medium such as a liquid or a gas. Under these conditions, HPP has been found to be effective in inactivating many pathogenic microorganisms commonly found in foods. As compared to pasteurized liquids, HPP significantly reduces the process temperature and time, which results in foods with improved characteristics such as better retention of freshness, flavor, texture, color, and nutrients.

Due to the increased shelf-life of products processed through HPP, in some applications it may be advantageous to supply packaged products in a large format or in bulk, such as in a variety of sizes up to and exceeding 5 gallons. This packaging is typically a sealed bottle, bag, or other container formed from a plastic such as polyethylene terephthalate. However, due to the process conditions, such as the high-pressure treatment applied to the packaging and food or liquid, problems can arise. For example, the vacuum generated in the packaging via application of the ultra-high pressure may cause catastrophic damage to the packaging.

BRIEF DESCRIPTION

According to one aspect of the invention, a container assembly configured for use in a high pressure process (HPP) includes a container defining a container cavity and a fitment assembly coupled to the container. The fitment assembly defines a passageway arranged in fluid communication with the container cavity. The fitment assembly further defines a chamber within the passageway isolated from the container cavity. A pressure relief mechanism is operably coupled to the fitment assembly to relieve pressure within the chamber.

In addition to one or more of the features described above, or as an alternative, in further embodiments said container has a flexible shape.

In addition to one or more of the features described above, or as an alternative, in further embodiments said container includes a bag.

In addition to one or more of the features described above, or as an alternative, in further embodiments said container cavity is configured to store a single serving of a consumable material.

In addition to one or more of the features described above, or as an alternative, in further embodiments said container cavity is configured to store a plurality of servings of a consumable material.

In addition to one or more of the features described above, or as an alternative, in further embodiments during an HPP process, said pressure relief mechanism is configured to vent fluid from said chamber to maintain a pressure within said chamber such that no damage occurs to the fitment assembly.

In addition to one or more of the features described above, or as an alternative, in further embodiments said fitment assembly further includes: a gland connected to said container, a fitting arranged within said gland, and a sealing element coupled to at least one of said gland and said fitting.

In addition to one or more of the features described above, or as an alternative, in further embodiments said pressure relief mechanism is formed in said sealing element.

In addition to one or more of the features described above, or as an alternative, in further embodiments said pressure relief mechanism is formed in a portion of said fitting.

In addition to one or more of the features described above, or as an alternative, in further embodiments said pressure relief mechanism is a hole.

In addition to one or more of the features described above, or as an alternative, in further embodiments said hole has a diameter between about 0.02 inches and about 0.1 inches.

In addition to one or more of the features described above, or as an alternative, in further embodiments said pressure relief mechanism includes a movable seal configured to deform when a pressure in said chamber exceeds a threshold.

According to another embodiment, a method of processing a consumable material in a container assembly includes filling an internal cavity of a container of said container assembly with a consumable material and sealing the internal cavity. A uniform pressure is applied to the container assembly at a certain temperature for a specific period of time and fluid is vented from a chamber of the passageway during the application of pressure. The chamber is isolated from the internal cavity.

In addition to one or more of the features described above, or as an alternative, in further embodiments said container assembly includes a fitment assembly having a gland connected to said container, a fitting arranged within said gland, and a sealing element coupled to at least one of said gland and said fitting.

In addition to one or more of the features described above, or as an alternative, in further embodiments said fitment assembly further defines said chamber between said fitting and said sealing element.

In addition to one or more of the features described above, or as an alternative, in further embodiments sealing said internal cavity further includes installing said fitting to said gland and attaching said sealing element to at least one of said fitting and said gland.

In addition to one or more of the features described above, or as an alternative, in further embodiments said venting fluid from a chamber occurs via a pressure relief mechanism formed in at least one of said fitting and said sealing element.

In addition to one or more of the features described above, or as an alternative, in further embodiments the size of said pressure relief mechanism is sufficient to avoid damage to said container assembly during said application of pressure.

In addition to one or more of the features described above, or as an alternative, in further embodiments said pressure relief mechanism includes a hole.

In addition to one or more of the features described above, or as an alternative, in further embodiments said pressure relief mechanism includes a movable seal configured to deform when a pressure in said chamber exceeds a threshold.

According to another embodiment, a system for providing a pre-mixed beverage from a distribution device includes a first container including a first consumable material and a second container including a second consumable material. The first consumable material is processed via application of a high pressure to said first container. A mixing block is arranged in fluid communication with both said first consumable material and said second consumable material to form a mixture thereof and supply said mixture to said distribution device. At least one pump is operably coupled to said distribution device and at least one of the first container and the second container.

The system for providing a pre-mixed beverage from a distribution device including a first container including a first consumable material and a secon container including a second consumable material, wherein said first consumable material is provided to said mixing block at a first flow rate and said second consumable material is provided to said mixing block at a second flow rate.

In addition to one or more of the features described above, or as an alternative, in further embodiments said first flow rate and said second flow rate are different.

In addition to one or more of the features described above, or as an alternative, in further embodiments said first flow rate and said second flow rate are the same.

In addition to one or more of the features described above, or as an alternative, in further embodiments at said first flow rate and said second flow rate are independently controllable.

In addition to one or more of the features described above, or as an alternative, in further embodiments at least one of said first flow rate and said second flow rate is controlled by a flow regulation device.

In addition to one or more of the features described above, or as an alternative, in further embodiments said flow regulation device includes a set screw.

In addition to one or more of the features described above, or as an alternative, in further embodiments said first consumable material is a mixer and said second consumable material is an alcohol complementary to said mixer.

In addition to one or more of the features described above, or as an alternative, in further embodiments said container assembly is configured to store a plurality of servings of said first consumable material.

According to another embodiment, a mixing block of a beverage dispensing system is provided including a first inlet for receiving a first fluid and a second inlet for receiving a second fluid such that the first and second fluids are mixed within the mixing block to form a mixture. A flow regulation device configured to control a flow of the first fluid through the first inlet. The flow regulation device is operable to adjust a ratio of the first fluid to the second fluid within the mixture.

In addition to one or more of the features described above, or as an alternative, in further embodiments at least one of the first inlet and the second inlet includes a turbulence-enhancing feature.

In addition to one or more of the features described above, or as an alternative, in further embodiments at least a portion of the mixing block is configured as a venturi.

In addition to one or more of the features described above, or as an alternative, in further embodiments the flow regulation device is a set screw.

These and other advantages and features will become more apparent from the following description taken in conjunction with the drawings.

BRIEF DESCRIPTION OF THE DRAWINGS

The subject matter, which is regarded as the present disclosure, is particularly pointed out and distinctly claimed in the claims at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION OF THE INVENTION

High pressure pasteurization ("HPP"), also known as high pressure processing and ultra-high pressure processing, is used to preserve foods and beverages by applying an elevated pressure at a specified low temperature for a predetermined period of time. Pressure within a chamber is created by either reducing the pressure chamber volume or by positively displacing the pressurizing material. Under such conditions, HPP has been effective at inactivating microorganisms commonly found in foods and beverages, making them safe for human consumption, similar to pasteurization. Cold, refrigerated food and beverage products that are processed via HPP have a substantially longer shelf life than their raw un-treated counterparts. As compared to conventionally pasteurized foods and beverages, HPP significantly reduces the process temperature and time, thereby resulting in foods and beverages having enhanced characteristics, such as improved retention of freshness, flavor, color, and nutrients for example.

Figure 1:
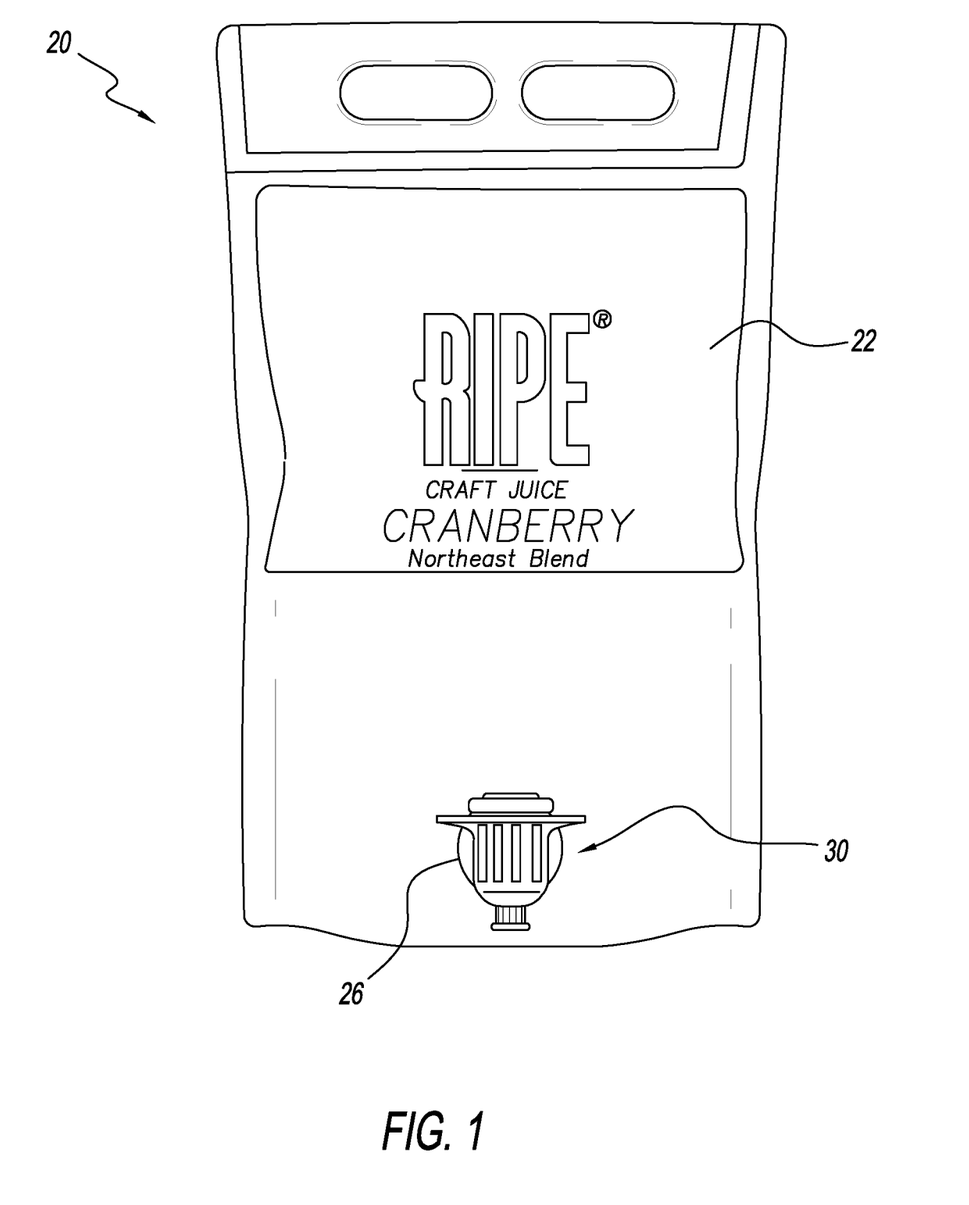
FIG. 1 is a top view of an example of a container assembly configured for use with a high pressure pasteurization ("HPP") process.

Referring now to the FIG. 1, an example of a container assembly 20 configured for use with HPP is illustrated in more detail. The container assembly 20 includes a flexible container 22 having a hollow internal cavity 24 (see FIG. 2). In the illustrated, non-limiting embodiment, the container 22 is a large, gusseted barrel-style bag formed by fusing together two or more flexible polymer pieces or bags. The illustrated container 22 is intended as an example only. It should be understood that other types of flexible containers 22 formed via any process and having any geometric configuration, such as a bag in box (BIB), doypack, pillow-type container, or barrel bag for example, are within the scope of the disclosure.

A consumable material intended to be pasteurized via an HPP process is stored within the internal cavities of the container 22. Although the container 22 is described as having a hollow internal cavity 24, it should be understood that the container 22 may have a plurality of distinct internal cavities 24. In embodiments where the container 22 includes multiple cavities 24, the consumable material within the cavities 24 may be the same, or alternatively, may be different. Examples of consumable materials include liquids and other beverages, such as syrups, purees, smoothies, pastes, juices, and wine for example. However, other consumable food materials like dressings, sauces, salsas etc. are also within the scope of the disclosure.

The container 22, and therefore the amount of consumable material stored in an internal cavity 24 thereof, may be formed in any of a variety of sizes. In one embodiment, the container 22 is configured to store a single serving of a consumable material, for example between about 3 and 20 ounces. In another embodiment, the container 22 is configured as a bulk container within which multiple servings are stored. When configured as a bulk container 22, the internal cavity 24 may be configured to store between about one liter and about 5 gallons of consumable material. However, other sizes exceeding five gallons are considered within the scope of the disclosure. The bulk container may be sized to contain the number of servings commonly consumed within the extended-shelf life of the consumable material therein. For example, if the consumable material within the bulk container has an extended shelf life of about 90 days, the internal cavity 24 may be sized to store the approximate number of servings that would be consumed on average, based on the application, within 90 days. In one embodiment, when intended to provide a large format, the container 22 is configured as a large bag, such as commonly used in conventional bag-in-box products for example.

The container assembly 20 additionally includes a fitment assembly 30 associated with an internal cavity 24 and extending through an opening 26 formed in a portion of the container 22. The fitment assembly 30 is fluidly coupled to the adjacent internal cavity 24 and may allow for quick connection and disconnection with a valve assembly, for example to fill the container 22 with a consumable material, without introducing air into the internal cavity 24. One or more components of the fitment assembly 30 may be selected based on the application of the container 22.

Figure 2:
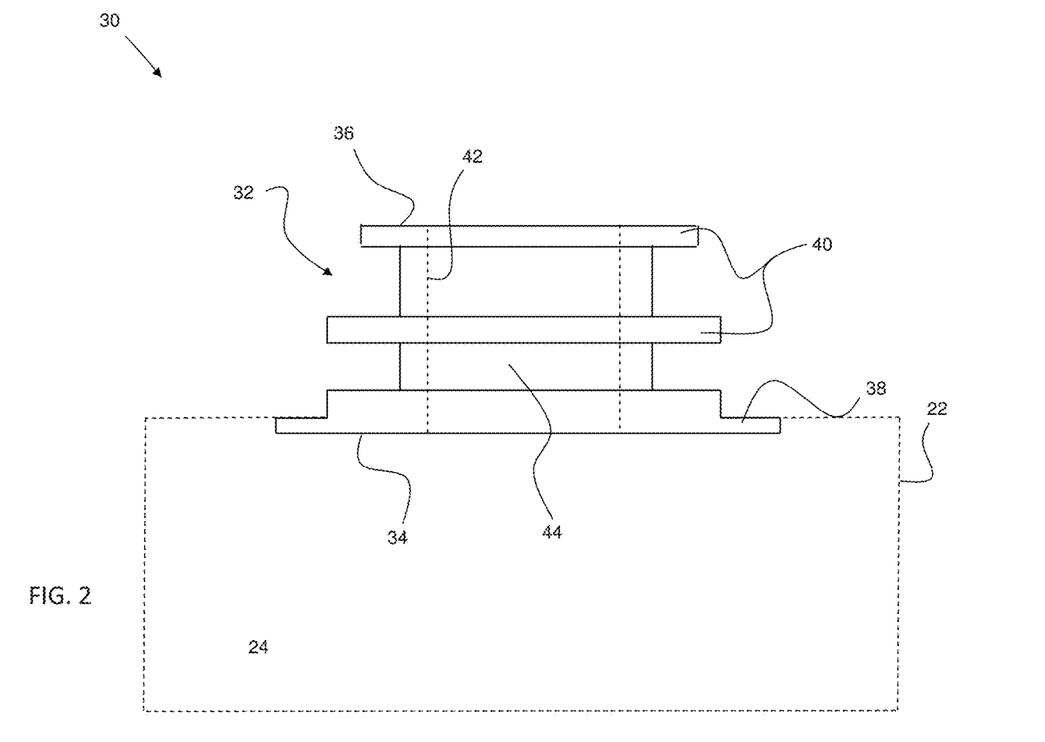
FIG. 2 is a side view of a gland of a portion of the fitment assembly of the container assembly according to an embodiment.

With reference now to FIG. 2, the fitment assembly 30 includes a fitment body, also referred to as a gland, 32 extending between a first end 34 and a second, opposite end 36. Although the gland 32 is illustrated as being generally cylindrical in shape, other shapes are also within the scope of the disclosure. The gland 32 may be formed from a durable material, such as plastic, polyethylene, or polypropylene for example. When the gland 32 is connected to the container 22, the gland 32 is positioned such that a portion thereof is mounted to or sealed against a surface of the container 22, such as an interior surface of the container 22 adjacent the opening 26 (FIG. 1) for example. As a result, the first end 34 of the gland 32 is disposed within the internal cavity 24 of the container 22, and the second end 36 of the gland 32 extends through the opening 26 and is exposed at an exterior of the container 22. In one embodiment, the portion of the gland 32 fused to the container 22 is an outwardly extending flange 38 arranged generally perpendicular to the axis of the gland 32 and having a diameter larger than the opening 26. One or more additional flanges 40 may extend outwardly from the gland 32, such as at the second end 36 thereof or an intermediate portion of the gland 32.

Figure 3:
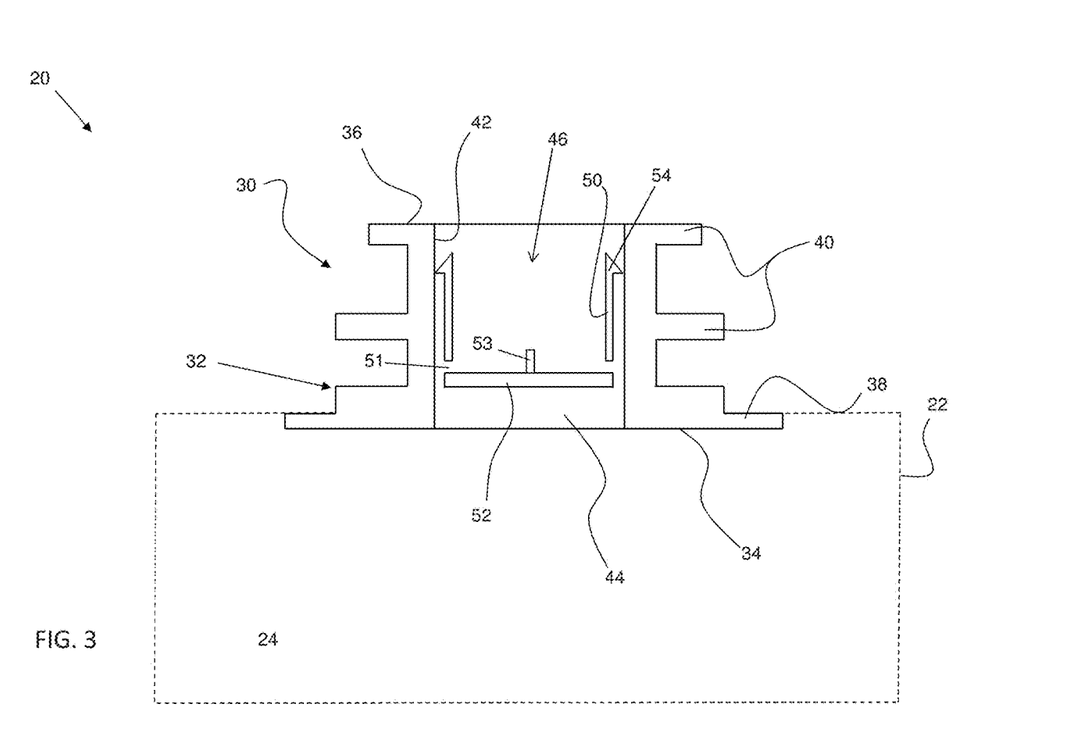
FIG. 3 is a cross-sectional view of a portion of the fitment assembly according to an embodiment.

An inner surface 42 of the gland 32 is configured to define a passageway 44 arranged in fluid communication with the internal cavity 24 of the container 22. With reference now to FIG. 3, the fitment assembly 30 further includes a valve or fitting 46 at least partially received within the passageway 44. The fitting 46 is configured to block or selectively control a flow of consumable material from the interior cavity 24. A variety of different fittings 46 may be associated with the gland 32. In the non-limiting embodiment illustrated in FIG. 3, the fitting 46 includes a sealing membrane insertable into the passageway 44. The sealing membrane has a circumferential sidewall 50 extending parallel to the interior surface 42 and a base 52 arranged at the end of the sidewall 50. As shown, one or more holes 51 are formed in the sidewall 50 and a post 53 extends vertically from the base 50 towards the second end 36 of the gland 32. In one embodiment, a mounting flange 54, complementary to an adjacent contour formed in the interior surface 42 is arranged at an opposite end of the sidewall 50. The mounting flange 54 may be configured to seat and retain the sealing membrane within the passageway 44, and additionally to form a seal isolating a portion of the passageway 44 from fluid communication with the cavity 24. When the sealing membrane is positioned within the passageway 44, the holes 51 formed in the sidewall 50 are positioned adjacent the interior surface 42 and are not arranged in coupled to the interior cavity 24. Although the sealing membrane is illustrated and described as being positioned directly within the passageway 44, in other embodiments, the sealing membrane may be connected to or formed as part of another component, such as a sealing element 70 (FIG. 5) for example.

Figure 6:
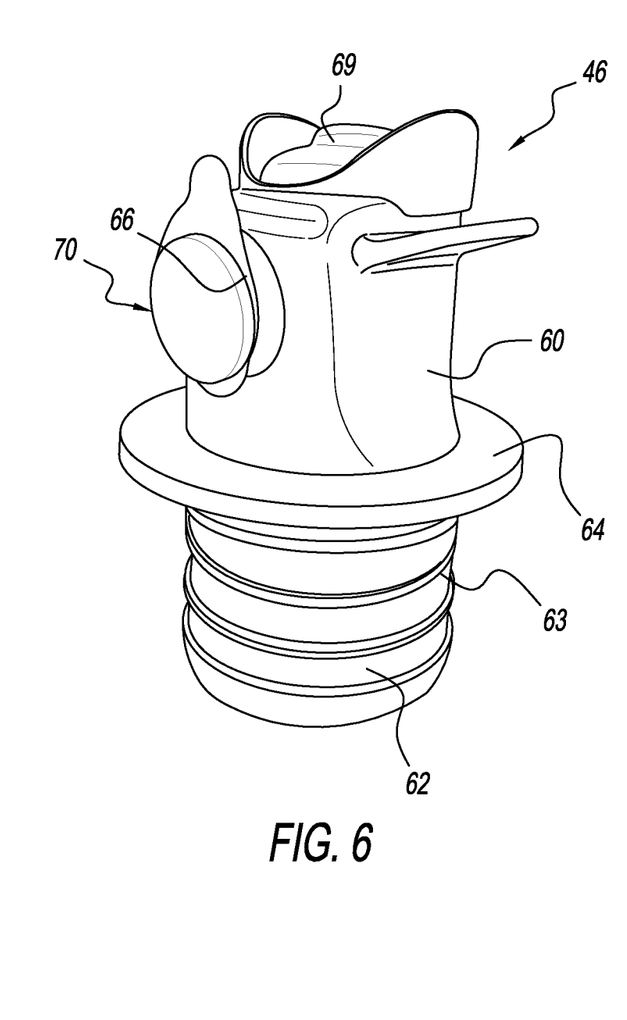
FIG. 6 is a perspective view of a portion of a fitment assembly according to an embodiment.
Figure 7:
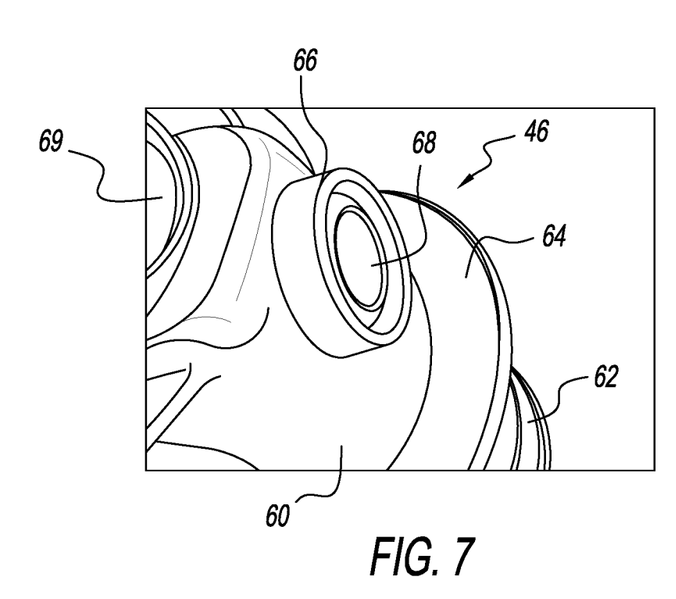
FIG. 7 is another view of the fitment assembly of FIG. 6 without the sealing element according to an embodiment.

Another example of a fitting 46 configured for association with the gland 32 is illustrated in FIGS. 6 and 7. In this embodiment, a first end 62 of the fitting body 60 has a diameter complementary to the interior surface 42 of the gland 32 such that the first end 62 is receivable within the passageway 44. The first end 62 may include a coupling mechanism 63, such as a plurality of threads for example, configured to engage a corresponding portion of the surface 42. As shown, the fitting body 60 includes an outwardly extending flange 64 configured to contact and abut the second end 36 of the gland 32 when the fitting 46 is mounted thereto. The fitting body 60 has a passageway (not shown) formed therein and extending between the first end 62 and a second end 66.

A movable element 68 (FIG. 7) is arranged within the passageway to selectively block the flow of the consumable material from the internal cavity 24 there through. As a result, the movable element 68 selectively forms a seal to isolate the passageway of the fitting downstream from the movable element 68 from fluid communication with the internal cavity 24 of the container 20. Application of a force to a mechanism 69 coupled thereto, such as a button or lever for example, moves the movable element 68 to break the seal and allow a flow of consumable material through the entire passageway of the fitting body 60. Although a plunger-type fitting is illustrated, other types of fittings may be used in the container assembly 20. Examples of such fittings include, but are not limited to, the Scholle Flextap®, Scholle FTC™, Scholle 1900™, Conro VPull®, and CPC UDC 9500000 for example. In an embodiment, a fitment assembly 30 including the Conro VPull® fitting 46 is intended for use with a single serving barrel bag, and a fitment assembly 30 include one of the Scholle Flextap®, Scholle FTC™, Scholle 1900™, and CPC UDC 9500000 fitting is intended for use with a bulk container, such as a five gallon bag in box for example. However, it should be understood that use of any type of fitting 46 is contemplated with any suitable container 20.

Figure 4:
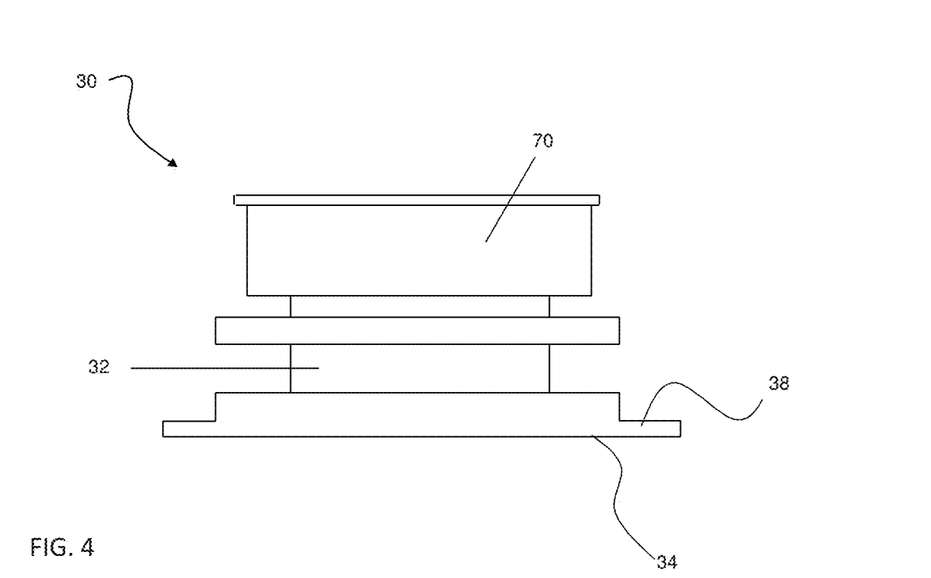
FIG. 4 is a side view of the fitment assembly according to an embodiment.

The fitment assembly 30 additionally includes a sealing element 70 configured to removably couple to a portion of the gland 32 or the fitting 46, as shown in FIGS. 4 and 7, respectively. In one embodiment, illustrated in FIGS. 4 and 5, the sealing element 70 includes a cap formed from a high density polyethylene, or a polypropylene material, such as through an injection molding process for example. In the example show in FIG. 5, the cap includes a body 72 having a sealed top surface 74 and an inner circumferential flange 76 and an outer circumferential flange 78. The two circumferential flanges 76, 78 are substantially concentric about a central axis of the body 72 and extend downward from the top surface 74. The inner circumferential flange 76 and the outer circumferential flange 78 are separated from one another by a distance to define a channel 80 there between.

Figure 5:
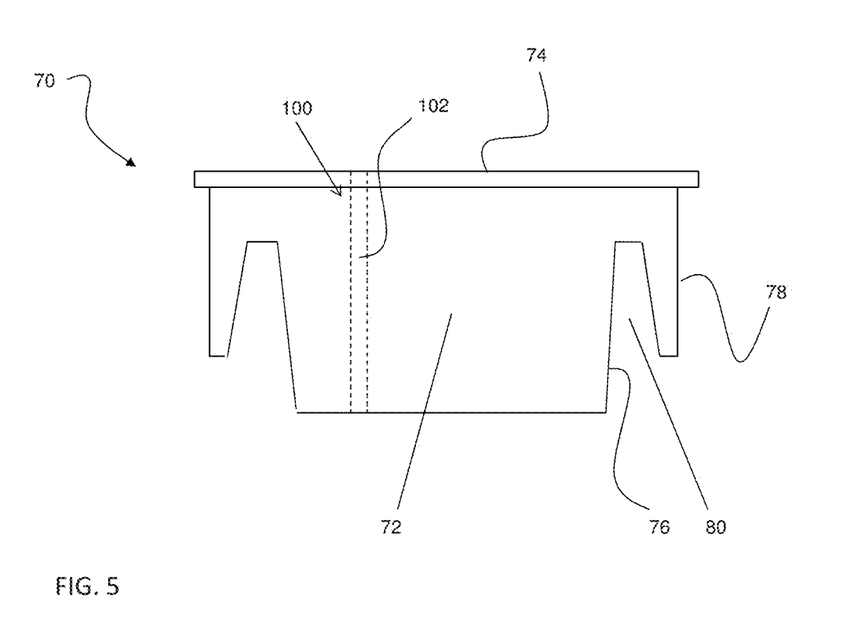
FIG. 5 is a side view of a sealing element of the fitment assembly according to an embodiment.

The channel 80 is sized to engage and retain a second end 36 of the gland 32 in an interference fit. Receipt of the gland 32 within the channel 80 is configured to form a hermetic seal. In one embodiment, a portion of the valve 46 is also received within the channel 80. At least one of the second end 36 of the gland 32, the valve 46, and the two circumferential flanges 76, 78 includes a structure, such as the mounting flanges 54 for example, configured to facilitate positive engagement of the distal end 36 of the gland 32 within the channel 80.

In another embodiment, illustrated in FIG. 6, the sealing element 70 includes a piece of foil attached, such as via a heat and/or hermetic seal for example, at the second end 66 of the passageway within the fitting 46. The foil similarly forms a hermetic seal at the second end 66 of the fitting 46 which prevents fluid and air from passing into the internal cavity 24.

Figure 8:
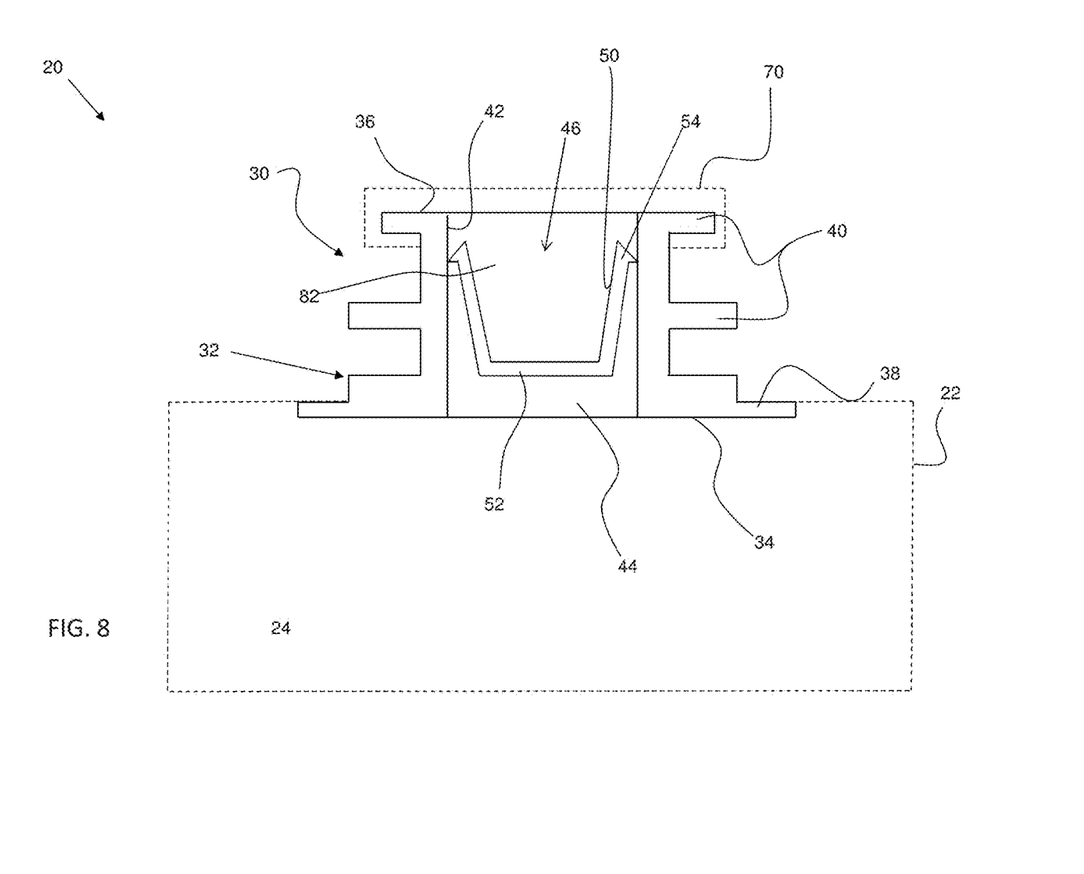
FIG. 8 is a cross-sectional view of the chamber defined within the fitment assembly of FIG. 5 according to an embodiment.

With reference now to FIG. 8, regardless of the configuration of the fitment assembly 30, a chamber 82 is formed between the fitting 46 and the adjacent sealing element 70. The chamber 82 is isolated from the internal cavity 24 of the container 22. In the embodiment illustrated in FIG. 8, the chamber 82 is defined between the sealing membrane within passageway 44 and an adjacent surface of the sealing element 70, which is mounted at the second end 36 of the gland 32. In the embodiment illustrated in FIGS. 6 and 7, the chamber 82 is formed between the sealing element 70 mounted at the second end 66 of the fitting 46 and an adjacent surface of the movable element 68 arranged within the passageway of the fitting 46.

With reference to FIGS. 5 and 7, a pressure relief mechanism 100 is formed in a portion of the fitment assembly 30 to prevent the formation of a vacuum within the chamber 82 when a high pressure is applied to the container assembly 20, such as during HPP for example. The pressure relief mechanism 100 is arranged in fluid communication with the chamber 82 and is selected so as not to affect the pressurization of the internal cavity 24, thereby ensuring pascalization of the consumable material disposed therein.

As shown in the embodiment of FIG. 5, the pressure relief mechanism 100 may include a small hole 102 extending through the sealing element 70. In other embodiments, such as the embodiment illustrated in FIG. 7, the hole 102 may alternatively be formed in a portion of the fitting 46, downstream from the movable element 68. In one embodiment, the hole 102 has a diameter between about 0.02 inches and about 0.10 inches, such as about 0.05 inches for example; however, it should be understood that holes of other sizes are also within the scope of the disclosure and that the size of the hole 102 may vary based on each application and the total amount of pressure experienced within the chamber 82.

In addition, other pressure relief mechanisms 100, such as a movable seal configured to deform when a pressure within the chamber 82 exceeds a predetermined value for example, are also within the scope of the present disclosure. For example, the seal formed between the gland 32 and one of the inner circumferential flange 76 and outer circumferential flange 78 of the sealing element 70 may loosen to allow a fluid, such as air for example, to vent from within the chamber 82. In another embodiment, the sealing element 70 functions as a pressure relief mechanism 100. In such embodiments, the sealing element 70 may be formed from a material having a suitable coefficient of expansion such that under pressure the sealing element 70 is configured to elastically deform to increase the size of the chamber 82 and withstand the vacuum produced therein, thereby preventing damage to the fitment assembly 30. Inclusion of any type of pressure relief mechanism 100 enables the use of an existing fitting 46 in HPP.

When a high pressure is applied to a container assembly 20 including a conventional fitment assembly 30, the pressure buildup within the chamber 82 typically causes catastrophic damage to at least one of the gland 32, the fitting 46, and the sealing element 70. Inclusion of a pressure relief mechanism 100, however, prevents the pressure within the chamber 82 from exceeding a threshold and causing damage, such as by allowing pressurized air and/or other fluids within the chamber 82 to vent to ambient for example. As a result, when a high pressure is applied to a container assembly 20 including a pressure relief mechanism 100, such as during HPP, pressure buildup or the formation of a vacuum within the chamber 82 capable of deforming a portion of the gland 32, fitting 46, or sealing element 70 is avoided.

Application of a pressure relief mechanism 100 as described herein to a conventional bag commonly used in a bag in box assembly or barrel-bag, transforms the bag into a container assembly 20 suitable for use in HPP. This is an unexpected result since it is generally understood in the industry, based primarily on test results, that these types of bags and fitment assemblies 30 are not compatible for use with HPP.

A method of using a container assembly 20 as described herein includes filling an internal cavity 24 of the container 22 with a desired quantity of a consumable material, such as a beverage for example. A fitting 46 and sealing element 70 are connected to the gland 32 to define a chamber 82 isolated from communication with the consumable material within the internal cavity 24 of the container 22. At least one of the fitting 46 and sealing element 70 contains a pressure relief mechanism 100. The container assembly 20 is then installed within an HPP chamber where a uniform pressure is applied to the container assembly 20 and the consumable material therein at a certain temperature for a specific period of time. When the pressure applied to the container assembly 20 approaches a value known to cause damage to conventional container assemblies 20, a small amount of fluid isolated from the cavity 24, for example air, is vented from the chamber 82 to outside the container assembly 20. As a result, the high pressure within the internal cavity 24 is maintained at a level sufficient to inactivate any microorganisms within the consumable material, and the pressure within the chamber 82 between the sealing element 70 and a portion of the fitting 46 is maintained at a pressure low enough to avoid damage to the fitment assembly 30. After HPP, the sealing element 70 may be removed and/or the fitting 46 may be moved to output consumable material from the internal cavity 24. For example, in the embodiment illustrated in FIG. 3, a coupling (not shown) attached to the vertical post 53 applies a force thereto, causing the sealing membrane to translate within the passageway until the holes 51 are arranged in fluid communication with the internal cavity 24.

Figure 9:
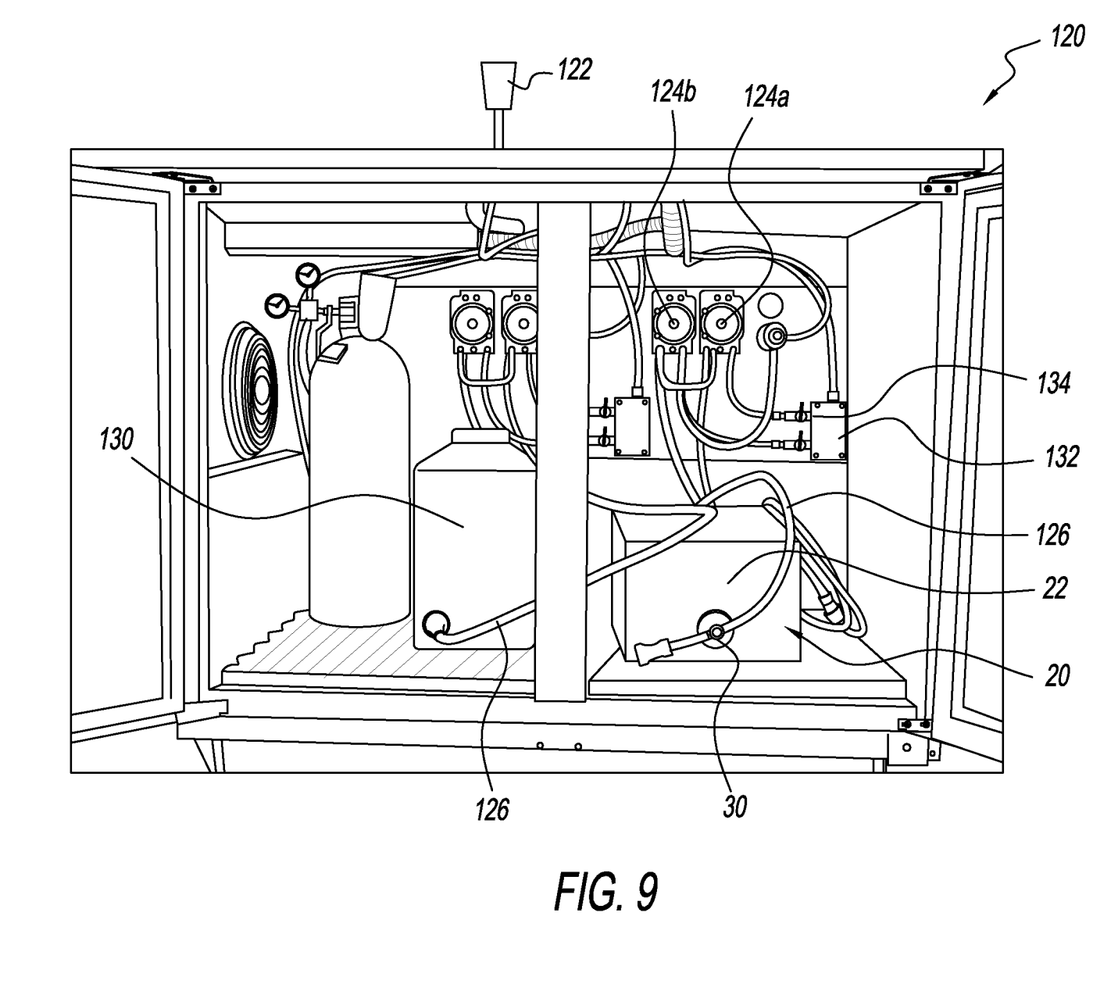
FIG. 9 is a perspective view of a system for preparing a mixture of consumable materials output from a single distribution device according to an embodiment.

Referring now to FIG. 9, a system 120 for providing a cold-pressed, fresh juice beverage from a tap, fountain, or other distribution device 122 is illustrated in more detail. The system 120 includes a container assembly 20 having an internal cavity 24 containing a plurality of servings of a consumable material that has been pascalized via HPP. In an embodiment, the consumable material is a cold pressed HPP juice which has improved an improved flavor compared to conventional pasteurized juice Previously, juice or other liquids pascalized via HPP were not available in large format containers, such as 5 gallon bag in boxes for example, due to the manufacturing difficulties previously described.

In embodiments where a non-diluted consumable material is output from the system 120, a pump 124 is operably coupled to the container assembly 20 and the distribution device 122 via one or more fluid conduits 126. Upon actuation of the distribution device 122, the pump 124 is operated to draw consumable material from the container assembly 20 and provide it to the distribution device 122. In one embodiment, a pre-existing system, such as the Tender-Pour® by Restaurant Services Inc. may be adapted to operate as system 120 described herein. However, modification of any commercial tap system is considered within the scope of the disclosure.

In another embodiment, the system 120 may be configured to provide a mixture of two or more consumable materials to a single distribution device 122. In such embodiments, the system 120 includes at least a container assembly 20 and a container 130 of a second consumable material. For example, in embodiments where the system 120 is configured to output a pre-mixed alcoholic beverage, the container 130 may include a desired type of alcohol, such as tequila for example, and the container assembly 20 may include a mixer complementary to the alcohol, such as lime juice for example. In an embodiment, the mixer includes a consumable material that has been pascalized via HPP, such as a cold pressed Ripe® or a Craft Bar Juice® for example. Although the system is described as having a first consumable material and a second consumable material, a system having more than two consumable materials is also considered within the scope of the disclosure.

Figure 10:
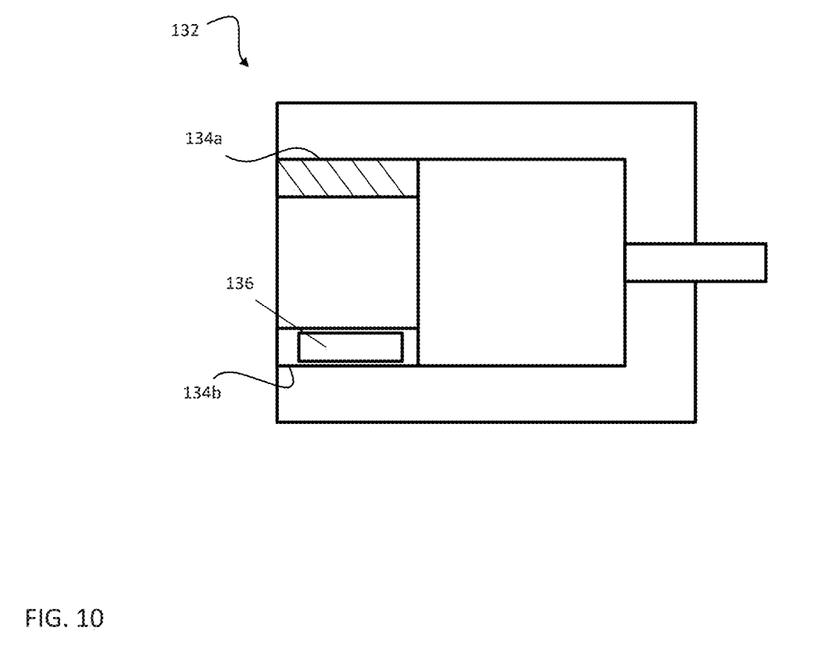
FIG. 10 is a schematic cross-sectional view of a mixing block of the system of FIG. 9 according to an embodiment.

The system 120 includes a mixing block 132 (FIG. configured to receive and mix a flow of both the first consumable material from the container assembly 20 and the second consumable material from the container 130. As shown, a first pump 124a is configured to supply the first consumable material from the container assembly 20 to a first inlet 134a of the mixing block 132 via one or more fluid conduits 126 and a second pump 125b is configured to provide the second consumable material from the container 130 to a second inlet 134b of the mixing block 132 via one or more fluid conduits 126. The mixing block 132 is configured such that the flow rate of the first consumable material and the flow rate of the second consumable may be controlled independently. In one embodiment, the mixing block 132 includes a flow regulation device 136, such as a set screw for example, arranged at the interface with at least one of the flow of the first consumable material and the second consumable material. The flow regulation device 136 may be adjusted to increase or decrease the amount of a consumable material provided to the mixing block 132, such as to control the ratio between the first consumable material and the second consumable material for example.

In an embodiment, a portion of the mixing block, such as one oft. be inlets 134 thereof, includes a turbulence-inducing feature, such as porting, ribs, or any other features which may affect the flow of a material into the mixing block. Alternatively, or in addition, a portion of one or all of the inlets 134 connected to the mixing block 132 may have a reduced cross-sectional area such that a venturi-like pressure drop is created within the mixing block 132. After being mixed in the mixing block 132, the pumps 124a, 124b cause the mixture of the first and second consumable materials to be supplied, such as via another fluid conduit 126 for example, to the distribution device 122.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of pascalizing a consumable material in a container assembly comprising a fitting adapted to dispense said consumable material from said container assembly subsequent to said pascalization, said method comprising:
   filling an internal cavity of a flexible container of said container assembly with a consumable material;
   sealing said internal cavity;
   applying a uniform pascalization pressure to an exterior of said container assembly; and
   providing pressure relief between said exterior of said container assembly and a chamber of a passageway within said fitting such that a pressure within said chamber does not cause catastrophic damage to said fitting during said applying of said uniform pascalization pressure, said passageway being adapted to be in fluid communication with said internal cavity during said dispensing of said consumable material from said internal cavity subsequent to said application of said pascalization pressure.

2. The method according to claim 1 wherein said pressure relief occurs via elastic deformation of a pressure relief mechanism provided between said chamber and said exterior of said container assembly.

3. The method according to claim 1 wherein said pressure relief is provided by venting fluid between said chamber and said exterior of said container assembly.

4. The method according to claim 3 wherein said fluid is vented through a hole in said fitting.

5. The method according to claim 1 which further includes attaching a sealing element to a second end of said passageway to form said chamber, said second end of said passageway being an opening of said passageway to said exterior of said container assembly.

6. The method according to claim 1 wherein said pascalization pressure is in the range of 30,000 to 130,000 psi.

* * * * *